(12) United States Patent
Kobayashi et al.

(10) Patent No.: US 7,750,939 B2
(45) Date of Patent: Jul. 6, 2010

(54) IMAGE PHOTOGRAPHING DEVICE AND RELEASE DEVICE

(75) Inventors: Toshiyuki Kobayashi, Yokohama (JP); Takayoshi Shimizu, Machida (JP); Koji Oka, Machida (JP)

(73) Assignee: Ricoh Company, Ltd., Tokyo (JP)

( * ) Notice: Subject to any disclaimer, the term of this patent is extended or adjusted under 35 U.S.C. 154(b) by 619 days.

(21) Appl. No.: 11/377,370

(22) Filed: Mar. 17, 2006

(65) Prior Publication Data

US 2006/0221189 A1    Oct. 5, 2006

(30) Foreign Application Priority Data

| Mar. 17, 2005 | (JP) | ............................. 2005-078167 |
| Mar. 17, 2005 | (JP) | ............................. 2005-078168 |
| Jan. 13, 2006 | (JP) | ............................. 2006-006613 |

(51) Int. Cl.
H04N 5/225 (2006.01)
H04N 5/232 (2006.01)
H04N 5/222 (2006.01)

(52) U.S. Cl. ............................. 348/207.1; 348/211.99; 348/333.07

(58) Field of Classification Search .............. 348/207.1, 348/211.2, 211.3, 211.4, 211.8, 333.07, 333.11, 348/362, 372
See application file for complete search history.

(56) References Cited

U.S. PATENT DOCUMENTS 4,426,662 A    1/1984 Skerlos et al.

| 6,256,060 | B1 * | 7/2001 | Wakui | ...................... 348/211.2 |
| 6,256,061 | B1 * | 7/2001 | Martin et al. | ............. 348/222.1 |
| 6,771,309 | B1 * | 8/2004 | Ide et al. | ................. 348/211.99 |
| 6,809,759 | B1 | 10/2004 | Chiang | |
| 6,826,360 | B2 * | 11/2004 | Lin et al. | ....................... 396/56 |
| 7,283,171 | B2 * | 10/2007 | Sakaguchi | ................... 348/362 |
| 2001/0043277 | A1 * | 11/2001 | Tanaka et al. | .......... 348/333.01 |
| 2002/0154221 | A1 * | 10/2002 | Ishimaru | ................... 348/207.1 |
| 2002/0154224 | A1 | 10/2002 | Yoneda | |
| 2004/0179100 | A1 * | 9/2004 | Ueyama | ..................... 348/152 |

FOREIGN PATENT DOCUMENTS

| JP | 3234247 | 9/2001 |
| JP | 2004-177687 | 6/2004 |
| JP | 2005-50040 | 2/2005 |
| JP | 2005-215495 | 8/2005 |

* cited by examiner

*Primary Examiner*—Nhan T Tran
*Assistant Examiner*—Trung Diep
(74) *Attorney, Agent, or Firm*—Oblon, Spivak, McClelland, Maier & Neustadt, L.L.P.

(57) ABSTRACT

An image photographing device (1), which converts an optical image of a subject into an electric signal by an image pick up device, and stores image data by the electric signal in an information recording medium (21), includes a communication interface (25), which communicates the image data, a determination device (31), which determines whether a device connected to the communication interface is an external device (2) or a release device (3), a communication process device (10), which conducts a communication process with the external device if the determination device determines that the external device is connected, and a photographing process device (10), which conducts a photographing process if the determination device determines that the release device is connected.

14 Claims, 15 Drawing Sheets

MONOPULSE

MULTIPULSE

MONOPULSE HAVING DIFFERENT PULSE WIDTH

MULTIPULSE HAVING DIFFERENT PULSE WIDTH

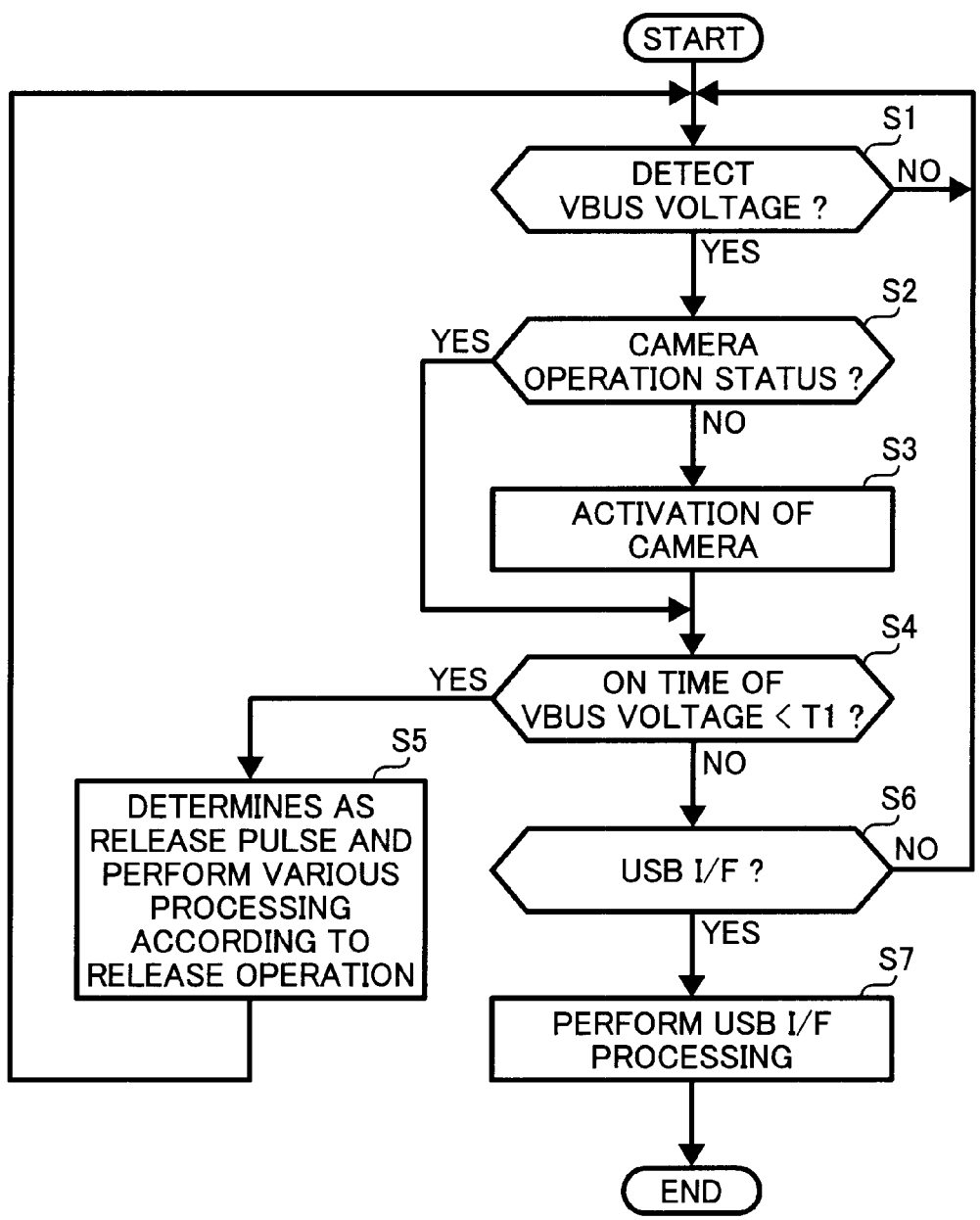

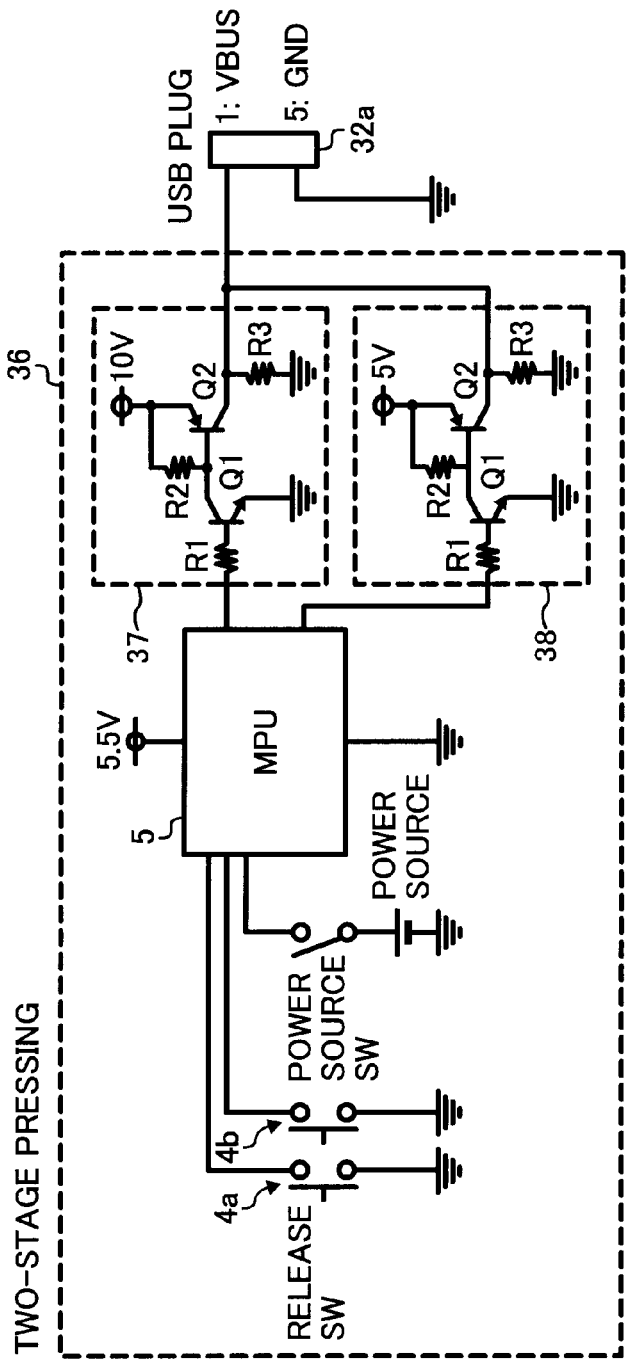

MULTIPULSE

MONOPULSE HAVING DIFFERENT PULSE WIDTH

MULTIPULSE HAVING DIFFERENT PULSE WIDTH

FIG. 15A

SETUP SCREEN

| CARD FORMAT | EXECUTION |
|---|---|
| RELEASE BUTTON SETTING | STANDARD |
| BUZZER | OFF |
| VBUS MODE SETTING | COMMUNICATION |

FIG. 15B

VBUS MODE SETTING SCREEN

| PC COMMUNICATION MODE | EXECUTION |
|---|---|
| EXTERNAL RELEASE PHOTOGRAPHING MODE | EXECUTION |

FIG. 15C

VBUS MODE FLAG

FLAG WHICH IS DISPOSED OVER PROGRAM MEMORY AND REFERS OVER PROGRAM

| PHOTOGRAPHING MODE FLAG | 0 : PC COMMUNICATION MODE WITH VBUS DETECTION<br>1 : PHOTOGRAPHING MODE WITH VBUS DETECTION |
|---|---|

IMAGE PHOTOGRAPHING DEVICE AND RELEASE DEVICE

BACKGROUND

1. Field of the Invention

The present invention relates to an image photographing device and a release device.

2. Related Art Statement

Conventionally, there has been known a camera capable of performing a release operation by connecting an external release device, so as to prevent camera shake during photographing.

There has been disclosed, for example, in Japan Patent No.3234247, a camera capable of handling operation processes with respect to two photographing operations of a normal photographing operation by a release button disposed in a camera and a photographing operation by an external release device.

By the way, if an external release device is connected to a camera, for example, a dedicated connecting port disposed in a case of a camera is normally used. However, recently, there have been demands for further downsizing a camera and decreasing a manufacturing cost. Under those circumstances, it has been becoming difficult to dispose a dedicated connecting port in a case of a camera for an external release device having a relatively low attach rate.

Moreover, there has been a demand for curving increase in power consumption by usage of an accessory product (optional product) such as an external release device as much as possible.

SUMMARY

Therefore, the present invention has been made in view of the above circumstances, and an object of the present invention is to provide an image photographing device capable of connecting an external release device without disposing a connecting port dedicated to an external release device.

Another object of the present invention is to provide an external release device, which can accomplish the same operation with an imaging photographing device with a low cost, and curve increase in power consumption in the imaging photographing device.

In order to achieve the above object, an image photographing device according to a first aspect of the present invention, which converts an optical image of a subject into an electric signal by an image pick up device, and stores image data by the electric signal in an information recording medium, comprises a communication interface, which communicates the image data; a determination device, which determines whether a device connected to the communication interface is an external device or a release device; a communication process device, which conducts a communication process with the external device if the determination device determines that the external device is connected; and a photographing process device, which conducts a photographing process if the determination device determines that the release device is connected.

According to one embodiment of the present invention, the photographing process device receives a signal from the release device by a power source line of the communication interface.

According to one embodiment of the present invention, a voltage detecting device, which detects a voltage level of the signal from the release device, is provided on the power source line.

According to one embodiment of the present invention, a signal amplifier, which amplifies the signal from the release device, is provided on the power source line.

According to one embodiment of the present invention, the photographing process device receives a signal from the release device by a monopulse signal.

According to one embodiment of the present invention, the photographing process device receives a signal from the release device by a plurality of pulse signals.

According to one embodiment of the present invention, the photographing process device receives a signal from the release device by a plurality of monopulses having different pulse widths each other.

In order to achieve the above another object, a release device according to a second aspect of the present invention, which is used by connecting to an image photographing device, which converts an optical image of a subject into an electric signal, and stores image data by the electric signal in an information recording medium, comprises a switch, which shifts an operation state of the image photographing device, and a control device, which controls to output a signal in accordance with an operation of the switch.

According to one embodiment of the present invention, the switch comprises a plurality of switches.

According to one embodiment of the present invention, the release device according to the second aspect of the present invention, further comprise a high pressure output circuit, which coverts the signal output from the control device into a high pressure pulse signal, and outputs the converted signal.

According to one embodiment of the present invention, the control device operates with operation voltage lower than normal operation voltage, and outputs a signal of a low voltage pulse lower than a normal voltage pulse in accordance with the operation of the switch.

According to one embodiment of the present invention, the control device outputs a monopulse signal in accordance with the operation of the switch.

According to one embodiment of the present invention, the control device outputs a plurality of pulse signals in accordance with the operation of the switch.

According to one embodiment of the present invention, the control device outputs a plurality of monopulse signals having different pulse widths each other in accordance with the operation of the switch.

According to one embodiment of the present invention, the control device shifts to an energy saving mode if the operation of the switch has not been performed for a predetermined period.

It is to be understood that both the foregoing general description and the following detailed description are exemplary, and are intended to provide further explanation of the invention as claimed.

The present application is based on and claims priorities from Japanese application Nos. 2005-078168, filed on Mar. 17, 2005, 2005-078167, filed on Mar. 17, 2005, and 2006-006613, filed on Jan. 13, 2006, the disclosures of which are hereby incorporated by reference herein in their entirety.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 5 is a flow chart explaining operations of a digital camera.

FIG. 10A is a view showing a structure of a release device according to a third embodiment.

FIG. 10B is a view showing a structure of a release device according to a third embodiment.

FIG. 15A is an explanation view showing a setting screen of a digital camera.

FIG. 15B is an explanation view showing a setting screen of a digital camera.

FIG. 15C is an explanation view showing a setting screen of a digital camera.

DETAILED DESCRIPTION OF THE PREFERRED EMBODIMENTS

Hereinafter, embodiments of an image photographing device according to the present invention will be described.

Figure 1:
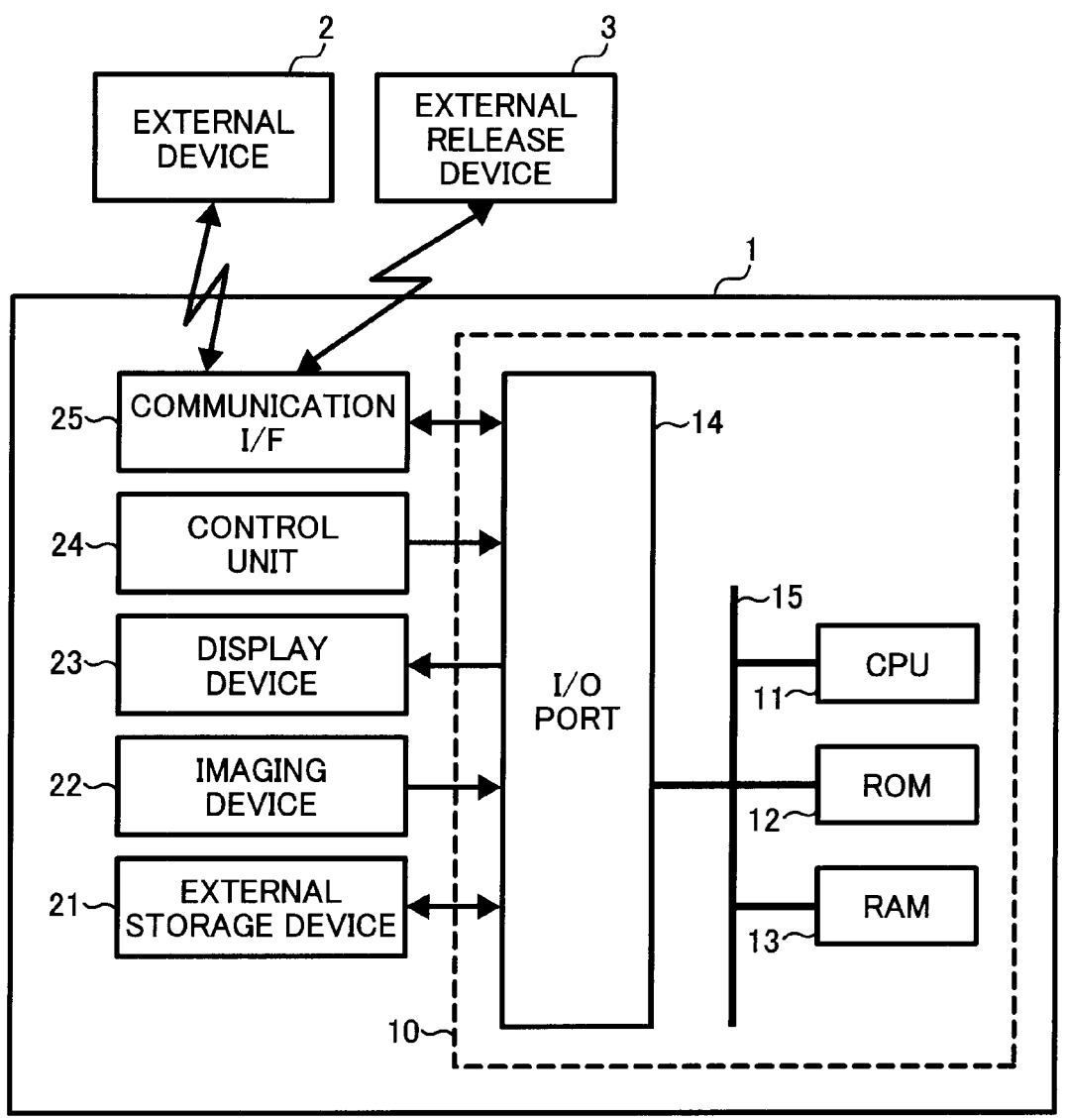
FIG. 1 is a block diagram showing an electrical connection of a digital camera according to a first embodiment of the present invention.

FIG. 1 is a block diagram of a digital camera of a first embodiment of an image photographing device according to the present invention.

A digital camera 1 shown in FIG. 1 comprises an external storage device 21 such as a flash memory, which stores information, a photographing device 22 having an input portion of image information such as a CCD of image pickup device and an A/D converter, a display device 23, which displays various information, a control unit 24, which conducts input from an external portion, a communication interface (I/F) portion 25, which is an interface for communication with an external device 2 such as a host computer and an external release device 3, and a main microcomputer 10, which controls the entire digital camera 1. The main microcomputer 10 comprises a CPU 11, a ROM 12, a RAM 13, an input/output port (I/O port) 14 and a bus line 15 connecting those. In addition, the main microcomputer 10 comprises a known MPU (Micro Processing Unit), for example.

The digital camera 1 according to the present embodiment has a feature that the interface with the external device 2 such as a personal computer and the interface with the external release device 3 are shared by the single communication I/F portion 25.

Hereinafter, a detailed explanation will be given for the digital camera 1 of the present embodiment.

Figure 2A:
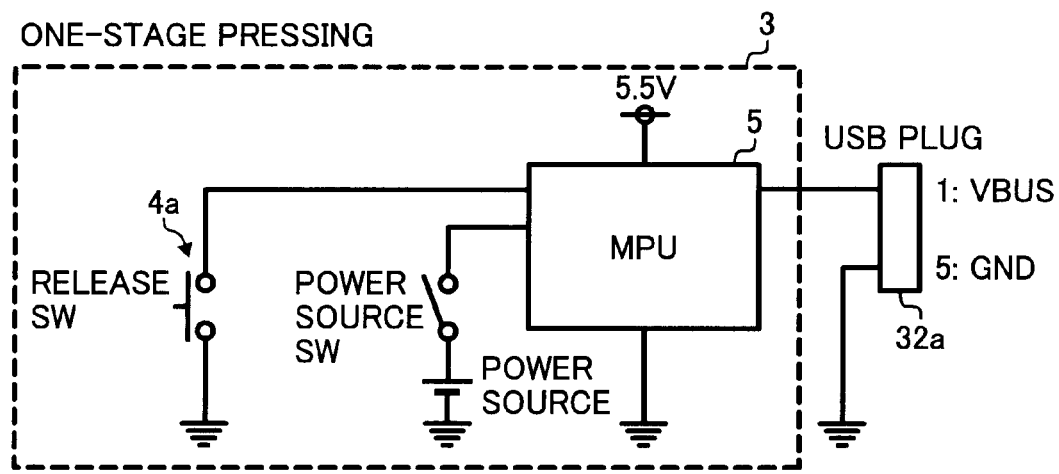
FIG. 2A is a view illustrating a structure of a release device according to the first embodiment of the present invention.
Figure 2B:
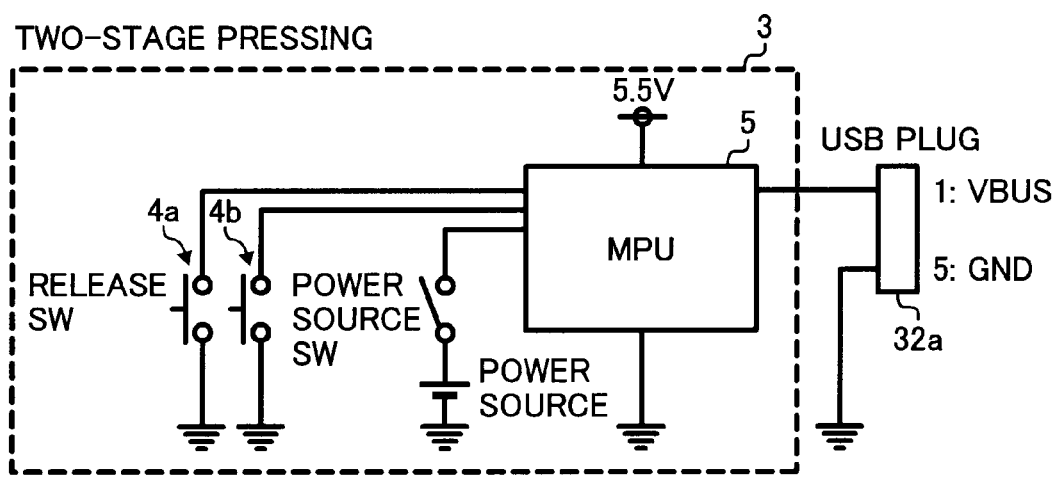
FIG. 2B is a view illustrating a structure of a release device according to the first embodiment of the present invention.

FIG. 2A shows an external release device 3 of one-stage switch (SW) and FIG.2B shows an external release device 3 of two-stage switch (SW).

The external release device 3 of one-stage switch (SW) shown in FIG. 2A comprises a first release SW 4a, which is turned on if a user presses a release, and a MPU 5, in addition to a power source and a power source switch. The MPU 5 outputs a monopulse from an end terminal corresponding to a power source line VBUS of an USB connector 32a if the first release SW 4a is turned on.

On the other hand, the external release device 3 of the two-stage SW shown in FIG. 2B comprises a second release SW 4b, which is turned on if a user full-presses a release, in addition to a first release SW 4a, which is turned on if a user half-presses the release. A MPU 5 outputs a first monopulse (first pulse) from an end terminal corresponding to a power source line VBUS of the USB connector 32a if the first release SW 4a is turned on. With this state, if the second release SW 4b is turned on, the MPU 5 outputs a next monopulse (second pulse) from the end terminal corresponding to the power source line VBUS of the USB connector 32a. In addition, the pulse widths of those first and second pulses are, for example, 30 ms to 100 ms.

Figure 3:
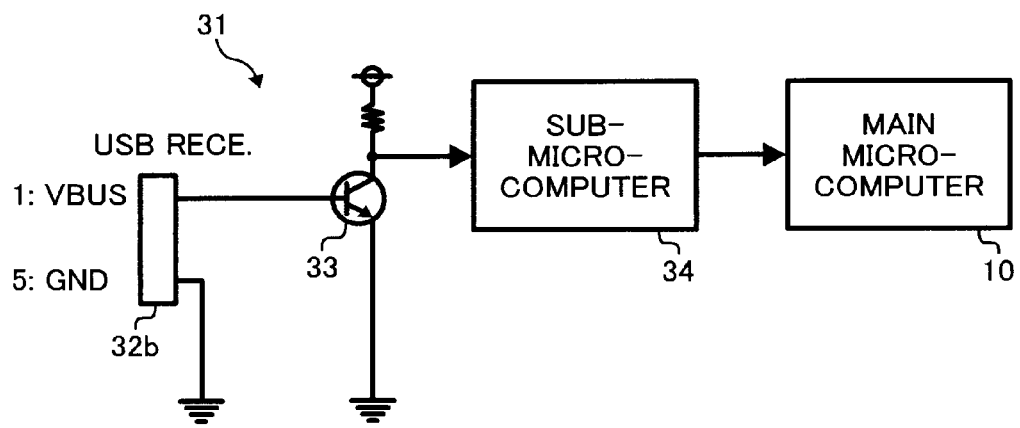
FIG. 3 is a view showing a structure of a connection detecting circuit in a communication I/F portion of the digital camera.

FIG. 3 is a view illustrating a structure of a connection detecting circuit 31 disposed in the communication I/F portion 25 of the digital camera 1. In this case, the digital camera 1 of the present embodiment is running.

In the digital camera 1, the communication I/F portion 25 is provided with the USB connector 32b having a USB standard. The USB connector 32b serves as an end terminal connecting the external device 2 and also serves as an end terminal connecting the external release device 3.

For example, if the external device (host computer) 2 is connected to the USB connector 32b, voltage (5V) is constantly applied to the power source line VBUS of the USB connector 32b from the external device 2. The power source line VBUS of the USB connector 32b is connected to a base of a transistor 33 comprising the connection detecting circuit 31. If the voltage is applied from the external device 2, the transistor 33 becomes an ON state and an input port of a sub microcomputer 34 constantly becomes a low level. Therefore, if the sub microcomputer 34 detects that the level of the input port is constantly a low level, the sub microcomputer 34 recognizes that the external device 2 is connected to the USB connector 32b, and then transmits the recognized result to the main microcomputer 10. Accordingly, the main microcomputer 10 starts a communication process with the external device 2.

On the contrary, if the external release device 3 is connected to the USB connector 32b, pulse voltage (5V) is applied to the power source line VBUS of the USB connector 32b in accordance with the release operation of the external release device 3. Therefore, the transistor 33 becomes ON only for a period that the pulse voltage is applied from the external release device 3, and the input port of the sub microcomputer 34 becomes a "low" level only for that period. Accordingly, the sub microcomputer 34 reorganizes that the external release device 3 is connected to the USB connector 32b in accordance with the transition of the voltage level of the input port, distinguishes the release operation in accordance with the number of pulses and the pulse width of the voltage pulse, and then transmits the reorganized result to the main microcomputer 10. Consequently, the main microcomputer 10 starts a photographing process in accordance with the release operation of the external release device 3.

In the digital camera 1 of the present embodiment, it is distinguished whether the device connected to the USB connector 32b is the external device 2 or the external release device 3. If the external device 2 is connected to the USB connector 32b, the communication process with the external device 2 can be conduced, and if the external release device 3 is connected to the USB connector 32b, the photographing process with the external release device 3 can be conducted.

Therefore, according to the digital camera 1, since the external release device 3 can be connected to the communication I/F portion 25, which conducts image data communication with the external device 2 such as a host computer, the external release device 3 can be used without disposing a connection port dedicated to the external release device 3 of the digital camera 1.

Moreover, as shown in FIG. 2B, by disposing a plurality of release SW 4a, 4b in the external release device 3, the same operations as a release bottom (not shown) of the digital camera 1 side, for example, focus lock and AE lock to be conducted by turning on the first release SW 4a and a release operation to be conducted by turning on the second release SW 4b can be achieved. Accordingly, comfortable operability can be provided for an operator.

Furthermore, since the external release device 3 is provided with power source, if the external release device 3 is connected to the digital camera 1, the digital camera 1 is not required to supply the power to the external release device 3. Therefore, the power consumption is not increased by the use of the external release device 3.

In the digital camera 1 according to the present embodiment, the sub microcomputer 34 is provided in the former stage of the main microcomputer 10, and the sub microcomputer 34 distinguishes a device connected to the USB connector 32b and analyzes the release operation if the device is the external release device 34. Therefore, the process to be conducted in the main microcomputer 10 can be decreased. Of course, the functions of the sub microcomputer 34 can be incorporated into the main microcomputer 10. Since a pulse pattern to be output from the external release device 3 in accordance with the release operation is set, the release operation conducted in the external release device 3 can be distinguished by detecting the setting with the digital camera 1.

The pulse pattern to be output in accordance with the release operation can be set based on, for example, the number of voltage pulses to be output, a pulse width, length of OFF period of a pulse to be output or the like.

Hereinafter, an explanation will be given with reference to FIGS. 4A-4F.

FIGS. 4A-4F are explanation views of voltage pulses to be supplied to the USB connector 32b of the digital camera 1.

Figure 4A:
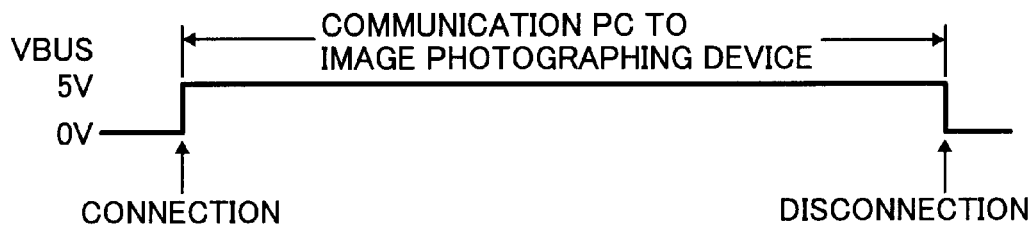
FIG. 4A is a view illustrating a pattern example of a pulse on VBUS.

FIG. 4A is a view illustrating a voltage waveform to be supplied from the external device (host computer) 2. If the external device 2 is connected to the USB connector 32b, 5V voltage is applied to the power source line VBUS from the external device 2 as specified in the USB specification. More particularly, if the external device 2 is connected to the USB connector 32b, 5V voltage is constantly applied to the power source line VBUS as shown in FIG. 4A, so the change in the voltage level from ON to OFF is limited when the voltage is disconnected. Therefore, in the digital camera 1 of the present embodiment, it is determined that the external device 2 is connected if the voltage (5V) is kept applying to the power source line VBUS during a predetermined period.

Figure 4B:
FIG. 4B is a view illustrating a pattern example of a pulse on VBUS.

On the other hand, if a device other than the external device 2, i.e., the external release device 3 is connected to the USB connector 32b, pulse voltage P is applied to the power source line VBUS such that the voltage level changes from ON to OFF at a rapid cycle as shown in FIG. 4B. Therefore, in the digital camera 1, if the voltage having the pattern that the voltage level changes from ON to OFF at a rapid cycle, i.e., the pulse voltage P is detected, it is determined that a device other than the external device 2 is connected.

Hereinbelow, it will be explained for pulse voltage to be output from the external release device 3.

Figure 4C:
FIG. 4C is a view illustrating a pattern example of a pulse on VBUS.

FIG. 4C is a view illustrating one example of pulse voltage to be achieved if the release SW of the external release device 3 shown in FIG. 2A comprises a one-stage pressing structure.

For example, if the first release SW 4a of the external release device 3 is pressed, the pressing strength, timing and pressing period are all different. Therefore, if the MPU 5 detects the pressing of the first release SW 4a, the MPU 5 outputs a monopulse P0 of a predetermined period to the power source line VBUS of the USB connector 32a. Accordingly, the pressing state of the release SW is transmitted to the digital camera 1 body by the monopulse.

Figure 4D:
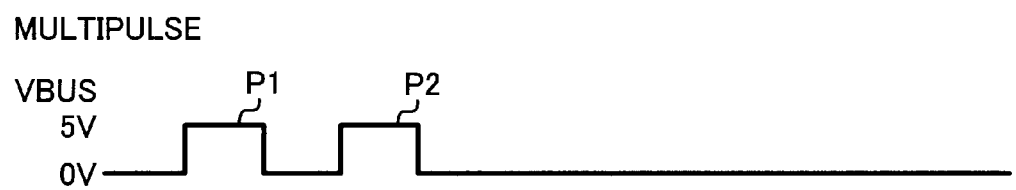
FIG. 4D is a view illustrating a pattern example of a pulse on VBUS.

FIG. 4D is a view showing one example of pulse voltage to be achieved if the release SW of the external release device 3 shown in FIG. 2B comprises a two-stage pressing structure.

Figure 4E:
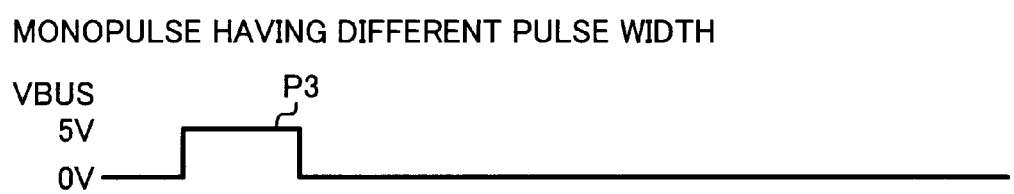
FIG. 4E is a view illustrating a pattern example of a pulse on VBUS.

For example, if the MPU 5 detects that the first release SW 4a of the external release device 3 is turned on, the MPU 5 outputs the voltage pulse P0 shown in FIG. 4C from the power source line VBUS of the USB connector 32b. From that state, if the MPU 5 detects that the second release SW 4b is turned on, the MPU 5 outputs a plurality of voltage pulses P1, P2 from the power source line VBUS of the USB connector 32a, or outputs the voltage pulse P3 having a different pulse width as illustrated in FIG. 4E from the power source line VBUS of the USB connector 32a. Therefore, the pressing state of the external release device 3 is transmitted to the digital camera 1 body.

For example, if a user half-presses the external release device 3, and the first release SW4a is turned ON to perform the AE/AF lock, the monopulse P0 having 10 msec pulse width is output. From that state, if the user full-presses the external release device 3, and the second release SW4b is turned ON to click a shutter, the monopuluse P3 having 100 msec pulse width is output. Moreover, if the user stops pressing the external release device 3 from the half-pressing state without clicking a shutter, more particularly, if the first release SW4a is turned off, a plurality of pulses P1, P2 of 10 msec is output.

Figure 4F:
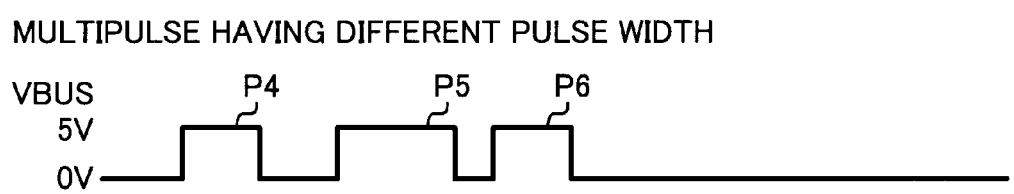
FIG. 4F is a view illustrating a pattern example of a pulse on VBUS.

In addition, in the example shown in FIG. 4F, the pressing state of the release SW is transmitted to the digital camera 1 body by using a plurality of pulses P4, P5, P6 having different pulse widths between the half-pressing and full-pressing.

In the above explanation, the number of pulses and a pulse width are changed based on the release operation of the external release device 3. However, when a plurality of pulses is output, for example, the time between the pulses is included to the setting. Accordingly, the pressing state of the external release device 3 can be absolutely transmitted to the digital camera 1.

Moreover, the above explanation was given for the operation when the digital camera 1 of the present embodiment was the activation state (power source ON). However, the digital camera 1 of the present invention, when the power source of is OFF if the external device 2 or the external release device 3 is connected to the USB connector 32b of the communication I/F portion 25, and the VBUS voltage is applied to the power source line VBUS, the power source is automatically activated.

Figure 6:
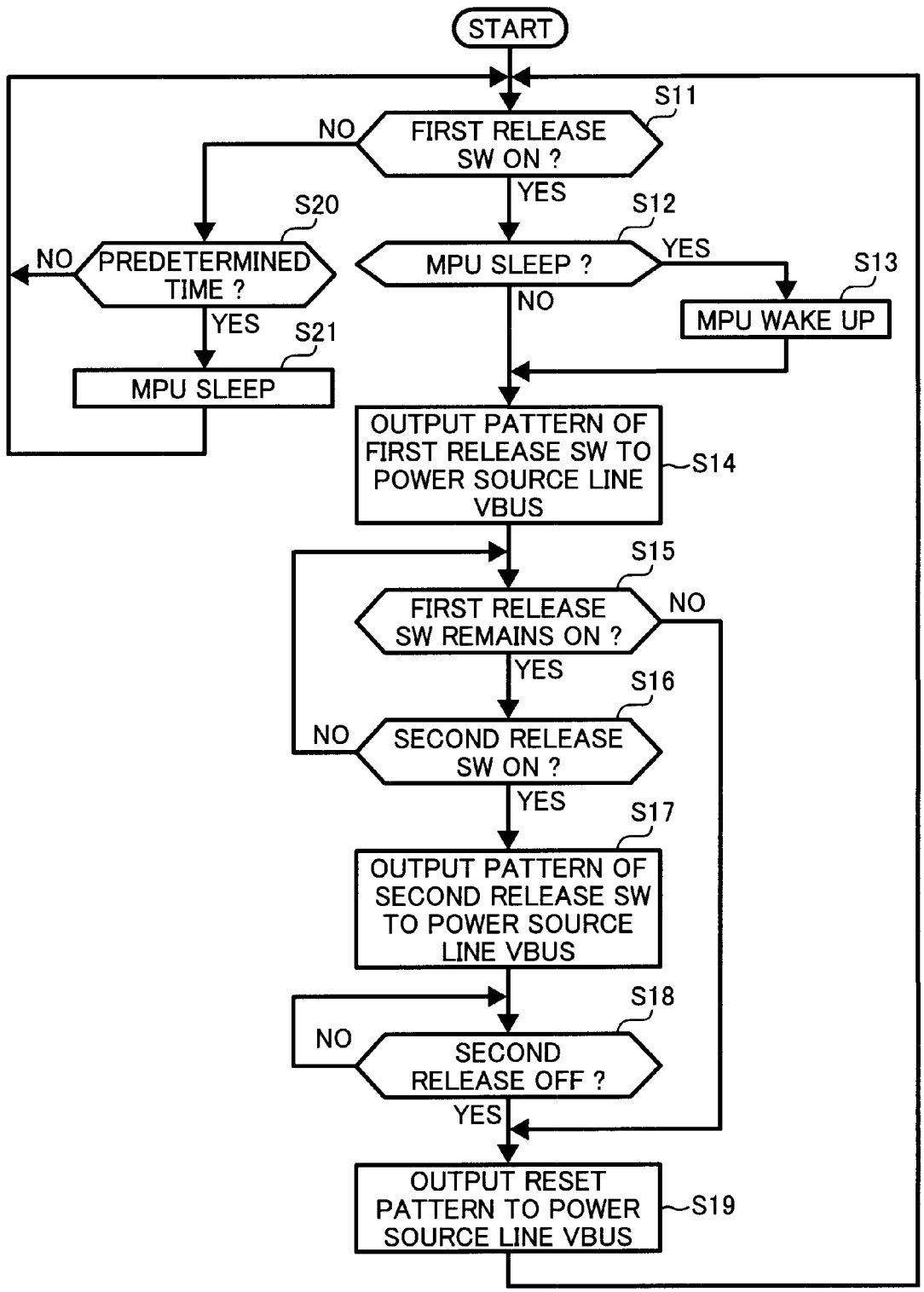
FIG. 6 is a flow chart explaining operations of a release device.

Hereinbelow, the operations of the digital camera 1 and the external release device 3 will be described with reference to the flowcharts shown in FIGS. 5, 6.

FIG. 5 is a flowchart illustrating processing to be performed by the digital camera 1. FIG. 6 is a flowchart illustrating processing to be performed by the external release device 3.

At first, the processing to be performed by the digital camera 1 is described with reference to the flowchart shown in FIG. 5. In addition, if the sub microcomputer 34 is built in the digital camera 1, the sub microcomputer 34 performs the processing shown in FIG. 5. If the sub microcomputer 34 is not built in, the main microcomputer (MPU) 10 performs the processing shown in FIG. 6. Here, the main microcomputer 10 performs the processing.

In this case, the main microcomputer 10 performs the voltage detection of the power source line VBUS of the communication I/F portion 25 (S1). If the VBUS voltage is detected, the main microcomputer 10 performs the discrimination whether or not the digital camera 1 is an operating state (S2). In this case, if the digital camera 1 is not the operating state ("NO" at S2), the main microcomputer 10 performs the activation processing of the digital camera (S3).

Thereafter, the main microcomputer 10 conducts the discrimination whether or not the ON time of the VBUS voltage is shorter than a previously set time T1 (S4). If it is shorter than the time T1 ("YES" at S4), the main microcomputer 10 determines that the ON time of the VBUS voltage is a release pulse, and performs various processes in accordance with the release operation. For example, if the external release device 3 is the two stage structure shown in FIG. 2B, the main microcomputer 10 performs the operation based on the operation of the first release SW4a, the operation based on the operation of the second release SW4b, the reset operation and the like.

On the other hand, if the negative result is obtained at step S4, more particularly, if the ON time of the VBUS voltage is longer than the time T1 ("NO" at S4), the main microcomputer 10 conducts next discrimination whether or not the USB I/F conducting the connection with the external device 2 is connected. If it is determined that the USBI/F is connected ("YES" at S6), the main microcomputer 10 performs the USBI/F process (S7), or if not, the flow goes back to step S1 to continue the processing.

Next, the processing to be performed by the external release device 3 is explained with reference to the flowchart shown in FIG. 6. In addition, the MPU 5 built in the external release device 3 performs the processing shown in FIG. 6.

In this case, the MPU 5 performs the determination whether or not the first release SW4a is turned on (S11), if it is determined that the first release SW4a is ON ("YES" in S11), the flow moves on to step S12.

Next, in step S12, it is determined whether or not the MPU 5 is a SLEEP state (S12), and if it is determined as the SLEEP state, ("YES" at S12), the MPU 5 is waken up (S13), and the pattern (pulse) voltage of the first release SW4a is output to the power source line VBUS (S14). In addition, it is determined that the MPU 5 is not SLEEP state at step S12 ("NO" at S12), the flow skips the process of step S13 to move on to step S14.

In the following step S15, it is determined whether or not the first release SW 4a remains ON. If the first release SW 4a remains ON ("YES" at S15), next, it is determined whether or not the second release SW 4b is turned on (S16). If it is determined that the second release SW 4b is turned on ("YES" at S16), the pattern of the pulse of the second release SW4b is output to the power source line VBUS (S17). In addition, at step S16, it is determined that the second release SW4b is not turned on ("NO" at S16), the flow goes back to step S15 to continue the processing.

Next, in step S18, it is determined whether or not the second release SW4b is turned off. If the second release SW4b is turned off, the flow goes back to step S1 to continue the processing after outputting the reset pattern to the power source line VBUS (S19).

In addition, it is determined that the first release SW4a does not remain OFF at step S15, the flow moves on to the step S19.

Moreover, in step S11, if it is determined that the first release SW 4a is not turned on ("NO" at S11), the flow moves on to step S20. In step S20, if it is determined that a predetermined time has passed ("Yes" at S20), the MPU 5 shifts to the sleep mode to be the energy saving state (S21), and the flow goes back to step S11.

More particularly, if the release SW is not pressed even thought a predetermined time has passed, the MPU 5 shifts to the sleep mode by stopping the operation clock and the like. In this sleep mode, if the MPU 5 detects the pressing of the first release SW 4a, the MPU 5 outputs the pattern of the first release SW 4a to the power source line VBUS by releasing the sleep state immediately.

Next, an explanation will be given for a second embodiment.

Figure 7A:
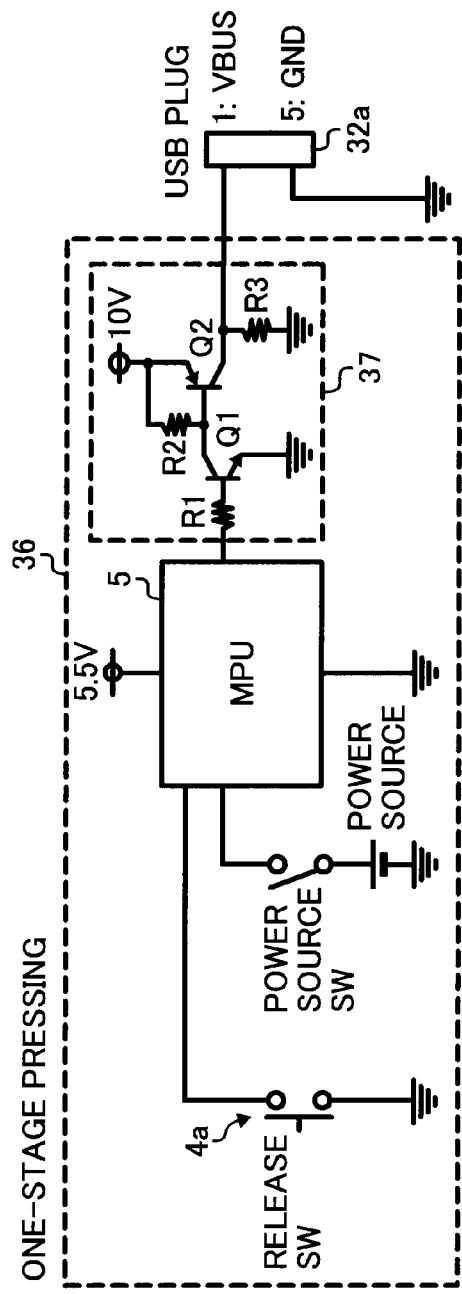
FIG. 7A is a view showing a structure of a release device according to a second embodiment.
Figure 7B:
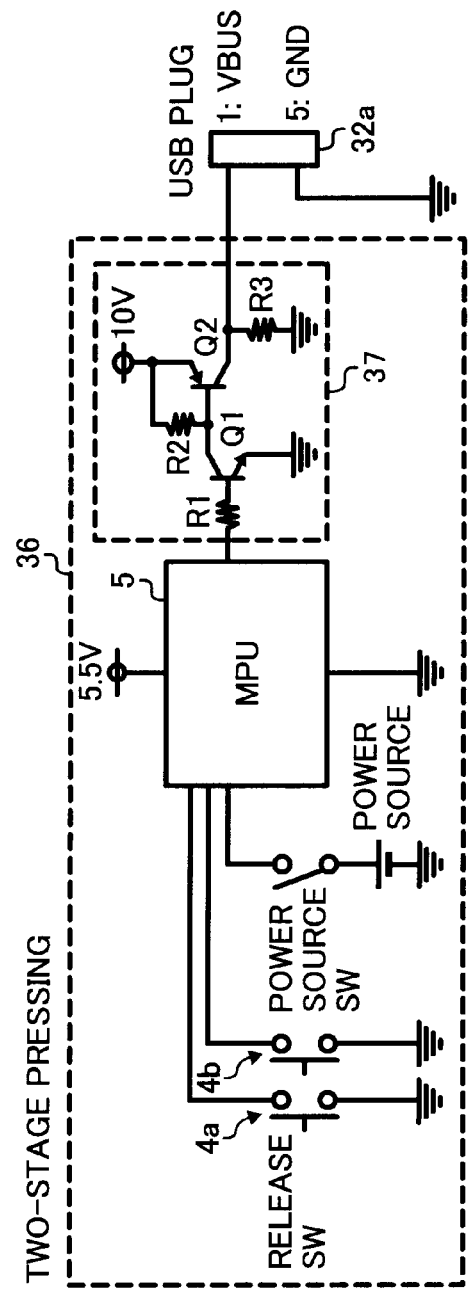
FIG. 7B is a view showing a structure of a release device according to the second embodiment.

FIG. 7A is an external release device of one-stage switch (SW) structure according to the second embodiment of the present invention. FIG. 7B is an external release device of two-stage switch (SW) structure according to the second embodiment of the present invention. In addition, in FIGS. 7A, 7B, the same reference numbers are used in the portions illustrated in FIGS. 2A, 2B; thus, the detailed explanation will be omitted.

An external release device 36 shown in FIG. 7A comprises a high pressure output circuit 37, which converts the 5V monopulse to be output from the MPU 5 when the first release SW 4a is pressed into the 10V monopulse, and outputs the converted pulse. The high pressure output circuit 37 comprises, for example, resistance R1, R2, R3, an npn-type transistor Q1 and a pnp-type transistor Q2 as shown.

Similarly, in an external release device 36 of two-stages switch (SW) structure shown in FIG. 7B, the 5V monopulse to be output from the MPU 5 when the first release SW 4a and the second release SW4b are pressed is converted into the 10V high pressure pulse and the converted pulse is output by the high pressure generation circuit 37.

Figure 8:
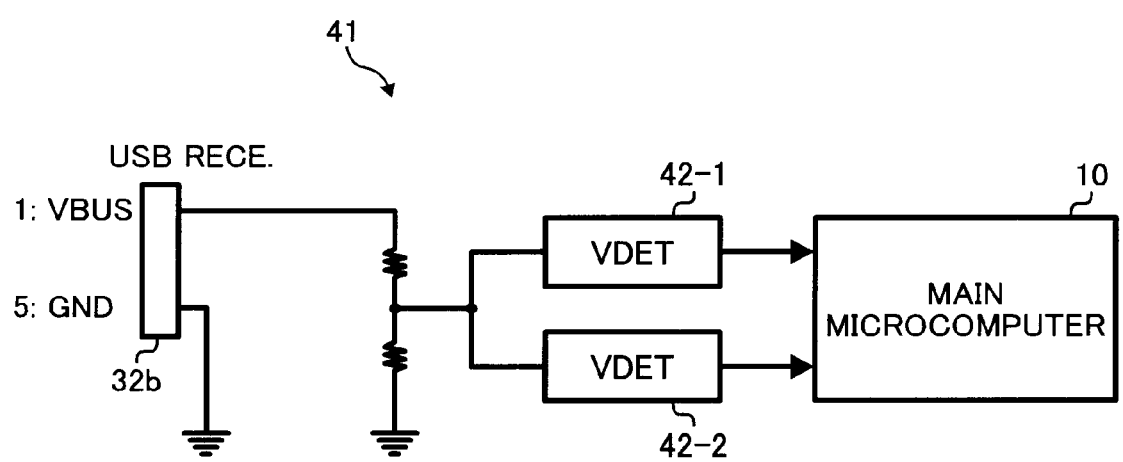
FIG. 8 is a view illustrating a structure of high voltage detection circuit in a communication I/F portion in a digital camera.
Figure 9A:
FIG. 9A is a view showing a pattern example of high voltage pulse on VBUS.
Figure 9B:
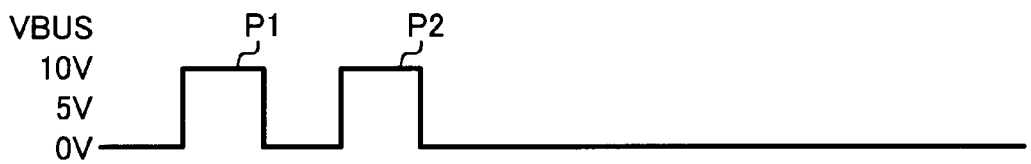
FIG. 9B is a view showing a pattern example of high voltage pulse on VBUS.
Figure 9C:
FIG. 9C is a view showing a pattern example of high voltage pulse on VBUS.
Figure 9D:
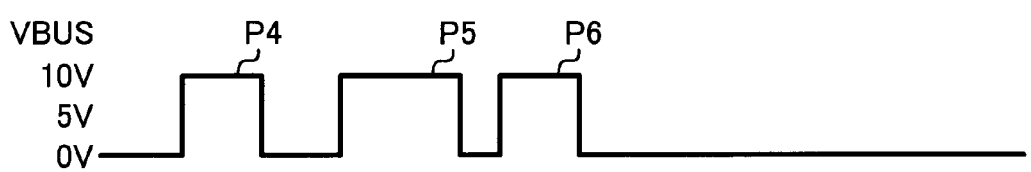
FIG. 9D is a view showing a pattern example of high voltage pulse on VBUS.

FIG. 8 is a view illustrating a structure of a connection detecting circuit 41 disposed in the communication I/F portion of the digital camera according to the second embodiment. The connection detecting circuit shown in FIG. 8 shows a circuit structure corresponding to a high pressure pulse that an electric device of the digital camera 1 side is not destroyed from the external release device 3.

The connection detecting circuit 41 shown in FIG. 8 comprises a first voltage detecting device (VDET) 42-1 and a second voltage detecting device (VDET) 42-2 as voltage detecting means.

If the external device 2 is connected, more particularly, if the voltage of 5V or more is detected, the first voltage detecting device (VDET) 42-1 outputs a high level (H) signal to the next stage's main microcomputer 10. On the other hand, if the second voltage detecting device (VDET) 42-2 detects voltage pulse of about 10V in the VBUS, the second voltage detecting device (VDET) 42-2 outputs a high level (H) signal to the main microcomputer 10. Therefore, if the both output from the first and second voltage detecting devices, 42-1, 42-2 are high levels, it can be determined that the voltage to be applied through the USB connector 32b of the connection detecting circuit 41 is a remote command from the external release device 3.

FIGS. 9A-9D are views illustrating high pressure pulses generated by the external release device. The waveforms of the high pressure pulses shown in FIGS. 9A-9D are the same as that in FIGS. 4C-4F except that the voltage levels are higher than that in FIGS. 4C-4F; thus, the detailed explanation will be omitted.

Next, a third embodiment of the present invention will be described.

FIG. 10A is a view illustrating a external release device of two-stage switch (SW) structure as one example of external release device according to the third embodiment. In addition, in FIG. 10A, the same reference numbers are used in the portions illustrated in FIG. 7A; thus, the explanation will be omitted.

An external release device 36 shown in FIG. 10A comprises a high pressure output circuit 37, which converts the 5V monopulse from the MPU 5 when the first release SW 4a or the second release SW 4b is pressed into the 10V monopulse, and outputs the converted pulse, and an output circuit 38, which outputs the 5V monopulse in accordance with the 5V monopulse from the MPU 5.

In this case, the high pressure output circuit 37 and the output circuit 38 can be achieved by the same circuit but changing the operation voltage to be applied as shown in FIG. 10A.

In this external release device 36, three values, 0V, 5V and 10V can be output based on the operation of the release SW 4a, 4b.

FIG. 10B is a view showing a relationship of detecting levels to be detected in the first and second detecting devices (VDET) of the connection detecting circuit 412 by the output levels of the external release device 36 shown in FIG. 10A.

For example, if the input level from the external release device 36 is 0V, both of the detecting levels of the first and second voltage detecting devices (VDET) 42-1, 42-2 are low levels (L). If the input level from the external release device 36 is 5V, the detecting level of the first voltage detecting device (VDET) 42-1 becomes a high level (H), and the detecting level of the second voltage detecting device (VDET) 42-2 becomes a low level (L). In addition, if the input level from the external release device 36 is 10V, both of the output levels of the first and second voltage detecting devices (VDET) 42-1, 42-2 become high levels (H). Thereby, the three values (0V, 5V, 10V) from the external release device 36 can be determined in the connection detecting circuit 41.

Figure 11A:
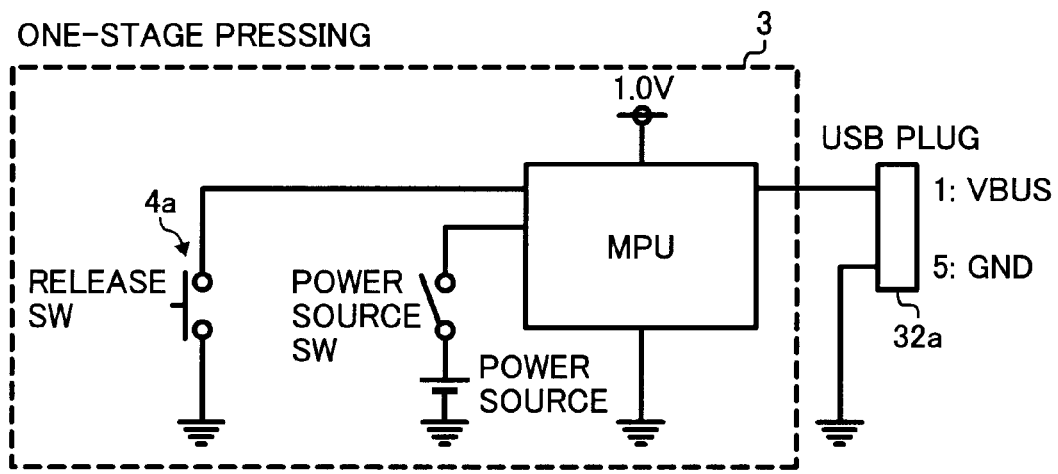
FIG. 11A is a view showing a structure of an external release device according to a fourth embodiment.

Next, a fourth embodiment of the present invention will be explained. FIG. 11A shows an external release device of one-stage switch (SW) according to the fourth embodiment, and FIG. 11B shows an external release device of two-stage switch (SW) according to the fourth embodiment.

Figure 11B:
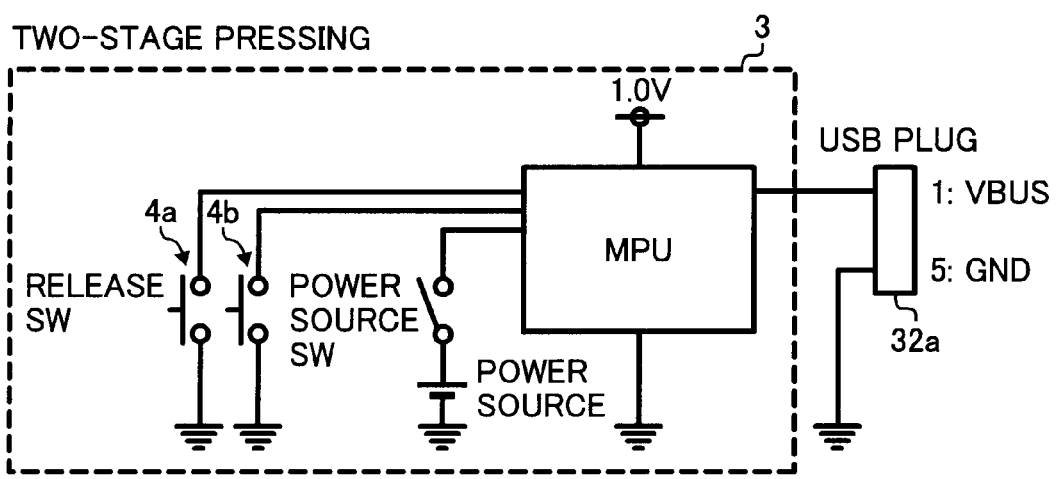
FIG. 11B is a view showing a structure of an external release device according to a fourth embodiment.

The external release devices shown in FIGS. 11A, 11B have the structures similar to the external release devices shown in FIGS. 3A, 3B. In the external release devices shown in FIGS. 3A, 3B, the operation voltage is 6V, respectively, and if the release SW 4a (4b) is pressed, the pulse having a voltage level of about 5V generates in the power source line VBUS. However, in the external release device shown in FIGS. 11A, 11B, the operation voltage is 1V in order to save electric power, and if the release SW 4a (4b) is pressed, a low voltage pulse having a voltage level of about 1V generates in the power source line VBUS.

Figure 12:
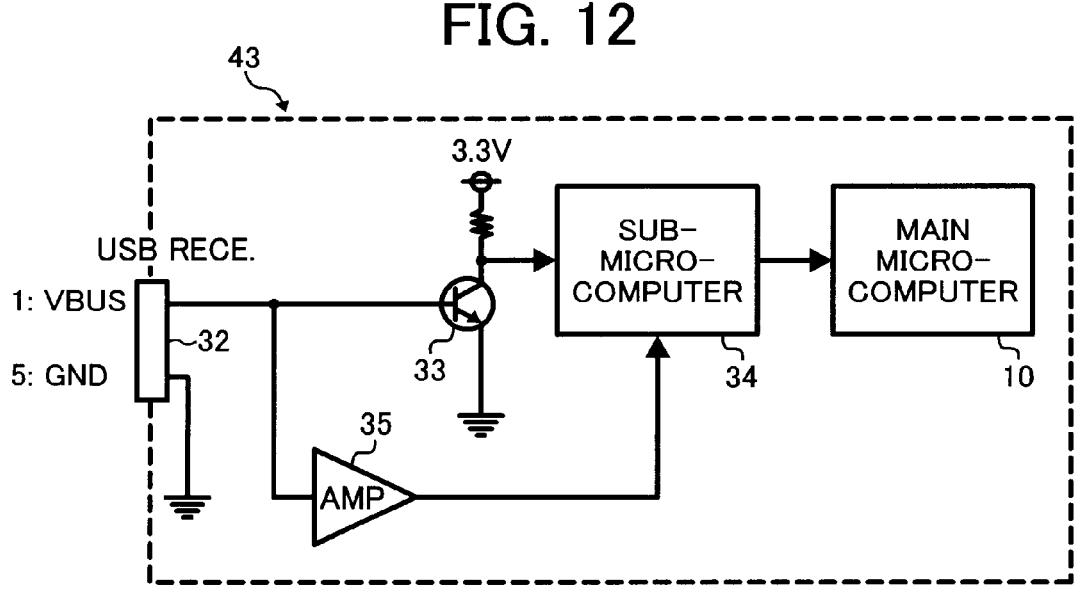
FIG. 12 is a view illustrating another structure of a connection detecting circuit in a communication I/F portion of a digital camera.
Figure 13A:
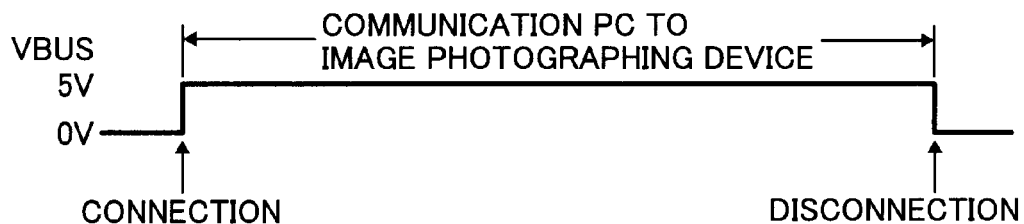
FIG. 13A is a view showing a pattern example of a low voltage pulse on VBUS.
Figure 13B:
FIG. 13B is a view showing a pattern example of a low voltage pulse on VBUS.
Figure 13C:
FIG. 13C is a view showing a pattern example of a low voltage pulse on VBUS.
Figure 13D:
FIG. 13D is a view showing a pattern example of a low voltage pulse on VBUS.
Figure 13E:
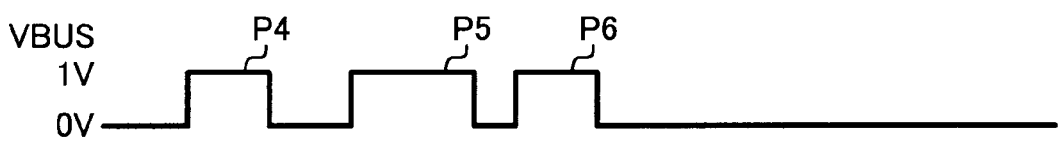
FIG. 13E is a view showing a pattern example of a low voltage pulse on VBUS.

FIG. 12 is a view illustrating a connection detecting circuit having a communication I/F portion of a digital camera capable of connecting the external release device shown in FIG. 11.

The connection detecting circuit 43 shown in FIG. 12 comprises a signal amplifier (Amp) on the power source line VBUS, so as to detect a state of a low voltage pulse from the external release device 3 shown in FIG. 11. The connection detecting circuit 43 can operates the release operation by the low voltage pulse from the external release device 3. In this case, if the low voltage pulse is input from the power source line VBUS of the USB connector 32b, the signal amplifier 35 converts the input low voltage pulse into the voltage amplitude of 3.3 V, for example, having a level close to the internal operation voltage of the digital camera 1, and supplies the voltage amplitude to the sub microcomputer 34. In addition, if 5V voltage is input from the power source line VBUS of the USB connector 32b, the signal amplifier 35 converts the voltage to the internal operation voltage level (3.3V) of the digital camera 1 by a transistor 33, and applies the voltage to the sub microcomputer 34.

If an USB standard device, for example, the external device (host computer) 2 is connected to the USB connector 32b of the connection detecting circuit 43, the voltage (5V) of the power source line VBUS is applied to the base of the transistor 33, and the collector current flows into the collector of the transistor 33. Accordingly, the input port of the sub microcomputer 34 becomes always "Low" level. Therefore, as described in FIG. 3, if the sub microcomputer 34 detects the level of the input port, and transmits the level to the main microcomputer 10, the main microcomputer 10 recognizes that the external device 2 is connected to the USB connector 32b of the connection detecting circuit 43, and starts the communication processing with the external device 2. In addition, if the external release device 3 as shown in FIG. 11 is connected to the USB connector 32b, the transistor 33 remains OFF. If a low voltage pulse is input to the USB connector 32b of the connection detecting circuit 43, the transistor 33 remains OFF.

FIGS. 13A-13E are views illustrating low voltage pulses to be produced by the external release device. The waveforms of high pressure pulses shown in FIGS. 13A-13D are the same as that in FIGS. 4C-4F except that the voltage level is higher than that in FIGS. 4C-4F; thus, the detailed explanation will be omitted.

Figure 14:
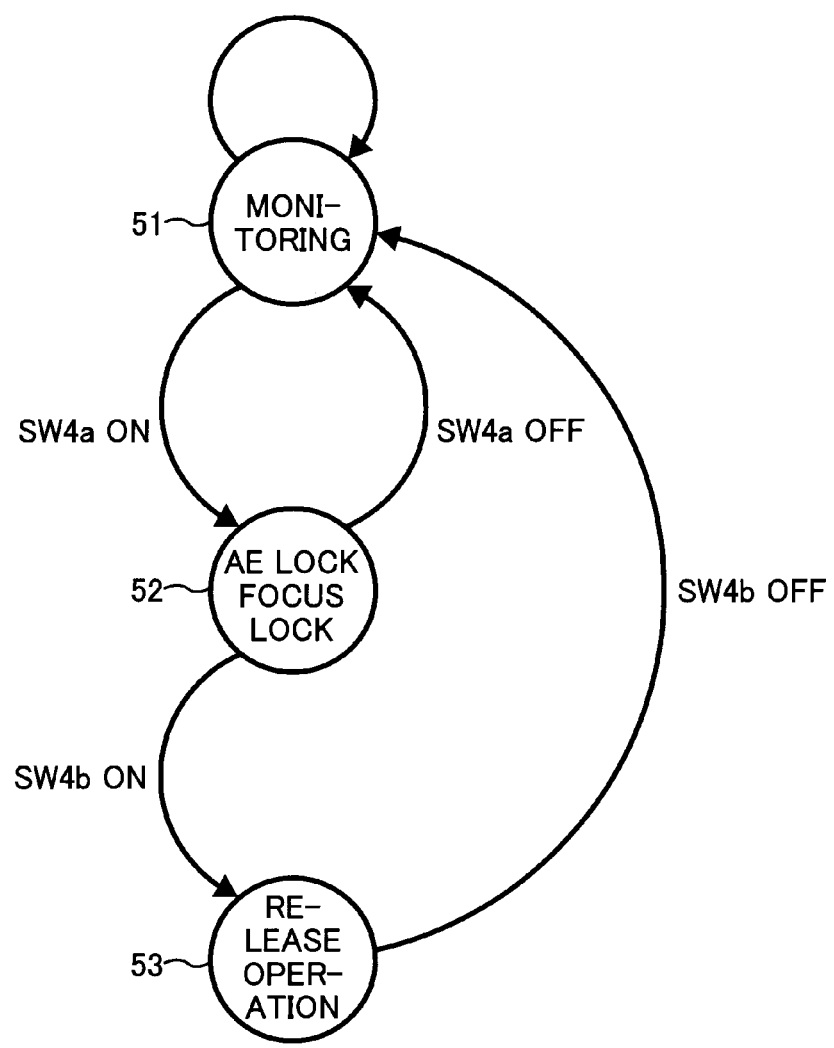
FIG. 14 is a view illustrating a state transmission by a release switch of an external release device.

FIG. 14 is a view illustrating a state transition by the release SW of the external release device 3 shown in FIG. 2B.

If the digital camera 1 is powered, and the first release SW 4a is pressed. (the first release SW 4a is turned on) from a monitoring state 51 before photographing, the operation of the digital camera 1 moves to an AE lock and focal lock state 52. Thereafter, if the second release SW 4b is pressed (the second release SW is turned on), the digital camera 1 moves to a release operation state 53. Moreover, the first release SW 4a is turned off from the AE lock and focus lock state 52, or if the second release SW 4b is turned off from the release operation state 53, the digital camera 1 moves to the monitoring state 51. Therefore, the release device can conducts the same operation as the image photographing device, such as the focus lock and release operation.

FIGS. 15A, 15B, 15C are explanation views showing setting screens of the digital camera 1.

In a setup screen (reference to FIG. 15A) of one example of a setting screen of the digital camera 1, various setting switches such as a card format and buzzer are available. In the present embodiment, an item of VBUS mode setting is added to such a setting switching screen. If the item of VBUS mode setting is selected by a cursor key (not shown), the screen moves to the VBUS mode setting (reference to FIG. 15B). If the mode is selected in the VBUS mode setting, the value set in the VBUS mode flag on the program memory is set (reference to FIG. 15C).

According to the image photographing device of the present invention, the communication interface, which communicates the image data with the external device, can be used as the interface for connecting the external release device. Therefore, the external release device can be used without providing a connection port dedicated to the external release device in the image photographing device.

According to the release device of the present invention, the same operation as that of the image photographing device such as focus lock and release operation can be performed.

It should be noted that although the present invention has been described with respect to specific embodiments, the invention is not limited to these specific embodiments.

What is claimed is:

1. An image photographing device, which converts an optical image of a subject into an electric signal by an image pick up device, and stores image data by the electric signal in an information recording medium, comprising:
   a communication interface configured to communicate the image data;
   a determination device configured to determine that a device connected to the communication interface is an external device when a continuous voltage is applied to a power source line of the communication interface in response to connection of the device, the determination device determining that the device is a release device when a pulsed voltage is applied to the power source line of the communication interface in response to connection of the device to the communication interface;
   a communication process device configured to conduct a communication process with the external device when the determination device determines that the external device is connected; and
   a photographing process device configured to conduct a photographing process when the determination device determines that the release device is connected,
   wherein the continuous voltage has a predetermined voltage level continuously applied from a time of connection of the device to the communication interface to a time of disconnection of the device.

2. The image photographing device according to claim 1, wherein the photographing process device receives a signal from the release device by a power source line of the communication interface.

3. The image photographing device according to claim 2, wherein a voltage detecting device, which detects a voltage level of the signal from the release device, is provided on the power source line.

4. The image photographing device according to claim 2, wherein a signal amplifier, which amplifies the signal from the release device, is provided on the power source line.

5. The image photographing device according to claim 1, wherein the photographing process device receives a signal from the release device by a monopulse signal.

6. The image photographing device according to claim 1, wherein the photographing process device receives a signal from the release device by a plurality of pulse signals.

7. The image photographing device according to claim 1, wherein the photographing process device receives a signal from the release device by a plurality of monopulses having different pulse widths each other.

8. The image photographing device according to claim 1, wherein the communication interface comprises a USB interface.

9. A release device, which remotely controls a shutter of an image photographing device, which converts an optical image of a subject into an electric signal by an image pick-up device, and stores the image data by the electric signal in an information recording medium, comprising:
   a USB connector configured to connect to a USB connector of the image photographing device;
   at least two switches configured to shift an operation state of the image photographing device; and
   a control device configured to output pulse signals to the image photographing device via a power source line of each of the USB connectors,
   wherein the control device outputs a first pulse signal to the power source line of the USB connectors in response to connection of the USB connector to the USB connector of the image photographing device, the control device outputs a second pulse to the power source line of the USB connectors when one of the switches is in an ON state, and the control device outputs a third pulse signal to the power source line of the USB connectors when the other switch is in an ON state, the first, second and third pulse signals being different.

10. The release device according to claim 9, further comprising a high pressure output circuit configured to convert pulse signals output from the control device into high pressure pulse signals, the high pressure output circuit being configured to output the converted pulse signals.

11. The release device according to claim 9, wherein the control device operates with operation voltage lower than normal operation voltage, and outputs pulse signals having a low voltage lower than a normal voltage pulse in accordance with the operation of the switch.

12. The release device according to claim 9, wherein the control device outputs a monopulse signal when one of the switches is in an ON state, and outputs a plurality of pulse signals when the other switch is in an ON state.

13. The release device according to claim 9, wherein the control device outputs, when one of the switches is in an ON state, the second pulse signal having a width different from the third pulse signal output when the other switch is in an ON state.

14. The release device according to claim 9, wherein the control device shifts to an energy saving mode if each of the switches is not in the ON state for a predetermined period.

* * * * *